UNITED STATES PATENT OFFICE.

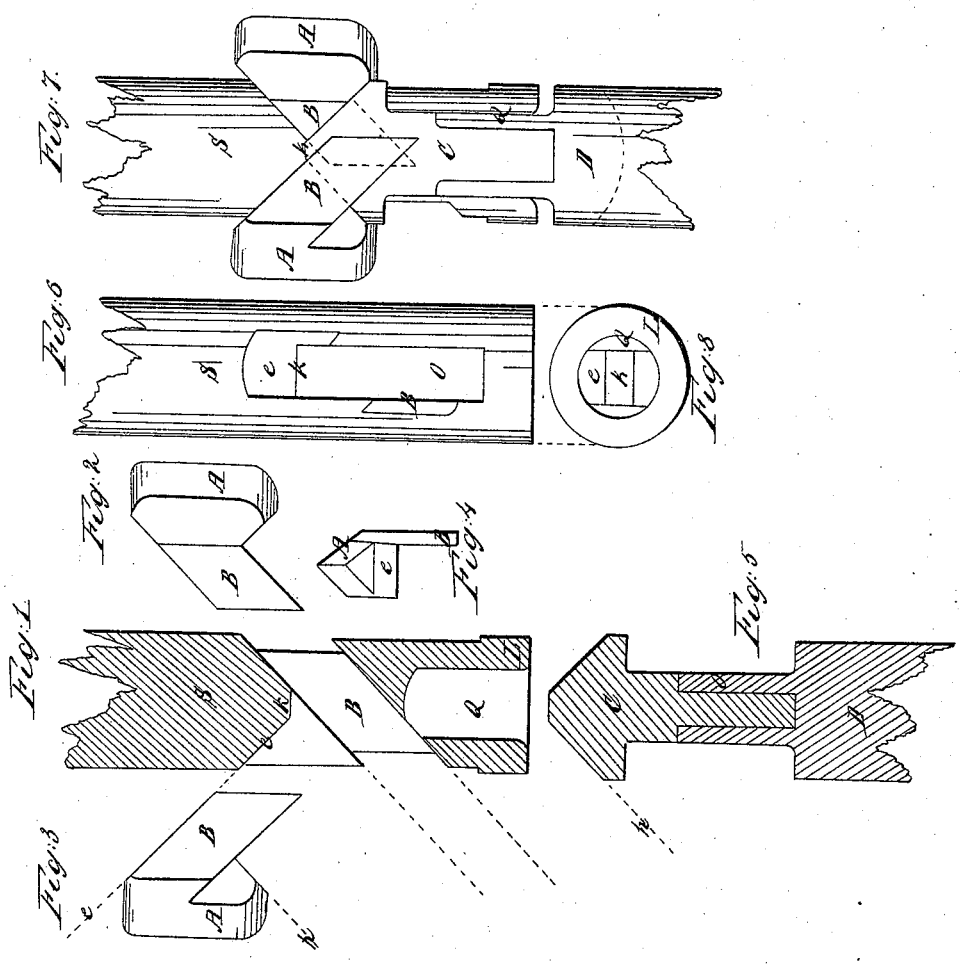
C. H. Webb,
Expanding Rock Drill.
N° 54,454. Patented May. 1, 1866.
Witnesses
Thomas McKibbin
Robert Carter
Inventor
Charles Hunter Webb

CHARLES HUNTER WEBB, OF SAN FRANCISCO, CALIFORNIA.

IMPROVED ROCK-DRILL.

Specification forming part of Letters Patent No. 54,454, dated May 1, 1866.

*To all whom it may concern:*

Be it known that I, CHARLES HUNTER WEBB, of the city of San Francisco, in the county of San Francisco and State of California, have invented a new, useful, and improved mode or method of operating drills used for chambering holes drilled in rock for blasting or other purposes, known as "Rock-Chambering Drill;" and I further declare that the following is a clear, full, and exact description of the improvement which I claim to have made—namely, the adoption of an angle of forty-five degrees, or nearly so, to the top and the bottom ends of the cutters or dies at their point of contact with the wedge by which they are driven; also, the same angle on the wedge on its points of contact with the cutters or dies; also, the same angle in the slot of the stock of the drill opposite to that occupied by the wedge and against which the other end of the cutters or dies than that on which the wedge is placed rests; and also the same angle on the arms or guides of the cutters or dies together; also, with the same angle in the grooves or channels in the stock of the drill in which the cutters or dies slide, the advantage of using this particular angle—namely, that of forty-five degrees—being that in operating the drill the whole length of the face of the cutting-edge of the cutters or dies is brought in the most effective manner to act against the rock, and that the force of a blow given in a line with the perpendicular of the instrument is imparted laterally to the rock with the greater force, precision, and effect in proportion as the true angle of forty-five degrees has been observed in the manufacture of the cutters or dies, the various slots in which they move, and the wedge by which they are driven, and also that the angle of forty-five degrees as applied for this purpose is that which gives the least possible amount of friction in the various parts of the instrument.

In the annexed drawings, which make a part of this specification, Figure $6^s$ is a perspective view of the instrument, with the cutters or dies A A, wedge C, and socket Q, Fig. $7^s$, removed, showing the face of the angle $e$ at one end of the slot $o$, and also the slots B B, in which the arms of the cutters or dies B, Fig. 4, move.

Fig. $8^L$ shows the end of $6^s$, in which $e\,e$ show part of the face of angle $e$ of Fig. $6^s$.

Fig. $7^s$ is a sectional view of Fig. $6^s$, with the cutters or dies A A and the wedge C as projected or forced by the blow, showing the points of contact of the wedge C with the angles of the ends of the backs of the cutters or dies A A and the angle $e$ at the end of slot $o$, Fig. $6^s$.

Fig. $1^s$ is a transverse section of Fig. $6^s$ with one side removed, in which is shown, at B, the angle of the groove or channel B, in which the arm B of cutter or die A, Figs. 2 and 3, moves.

Fig. $3^B$ shows the angles of arm of cutters or dies, and $e$, Fig. 3, shows the angles of one end of back of cutters or dies, Figs. 2 and 4, A A, Fig. 7, corresponding with angle $e$, Fig. $6^s$ and Fig. $1^s$; and $h$, Fig. 3, shows the angle of one end of cutter or die, corresponding with angle of $h$ C, Fig. 5, which is side view of wedge C, Fig. $7^s$.

I do not claim as mine any particular form of construction of drills for chambering holes drilled in rock for blasting purposes, nor of the kind of material to be used in their manufacture; neither do I claim the manner in which or for which they may be employed, as I am aware that application for a patent has been made by J. M. Linscott, or his assigns or executors, for an instrument called "a drill for chambering the holes drilled in rock;" but I do claim—

The arrangement at an angle of forty-five degrees of each end of the back of the cutters or dies, together with the arms or guides thereof, at the same angle of forty-five degrees of each edge of the wedge by which the cutters or dies are driven at its points of contact with the cutters or dies, and also at the same angle of forty-five degrees of the various slots in which the cutters or dies are made to traverse in their propulsion by the blow toward the rock and their recoil therefrom, each separately and the whole collectively, for the purpose described—namely, the effective delivery of the blow with the least amount of friction.

CHAS. H. WEBB.

Witnesses:
JNO. J. HALEY,
ROBERT CARTER.